Feb. 20, 1951      J. A. DINWIDDIE      2,542,487
PRODUCTION OF OLEFINS FROM OXIDES
Filed Oct. 17, 1947
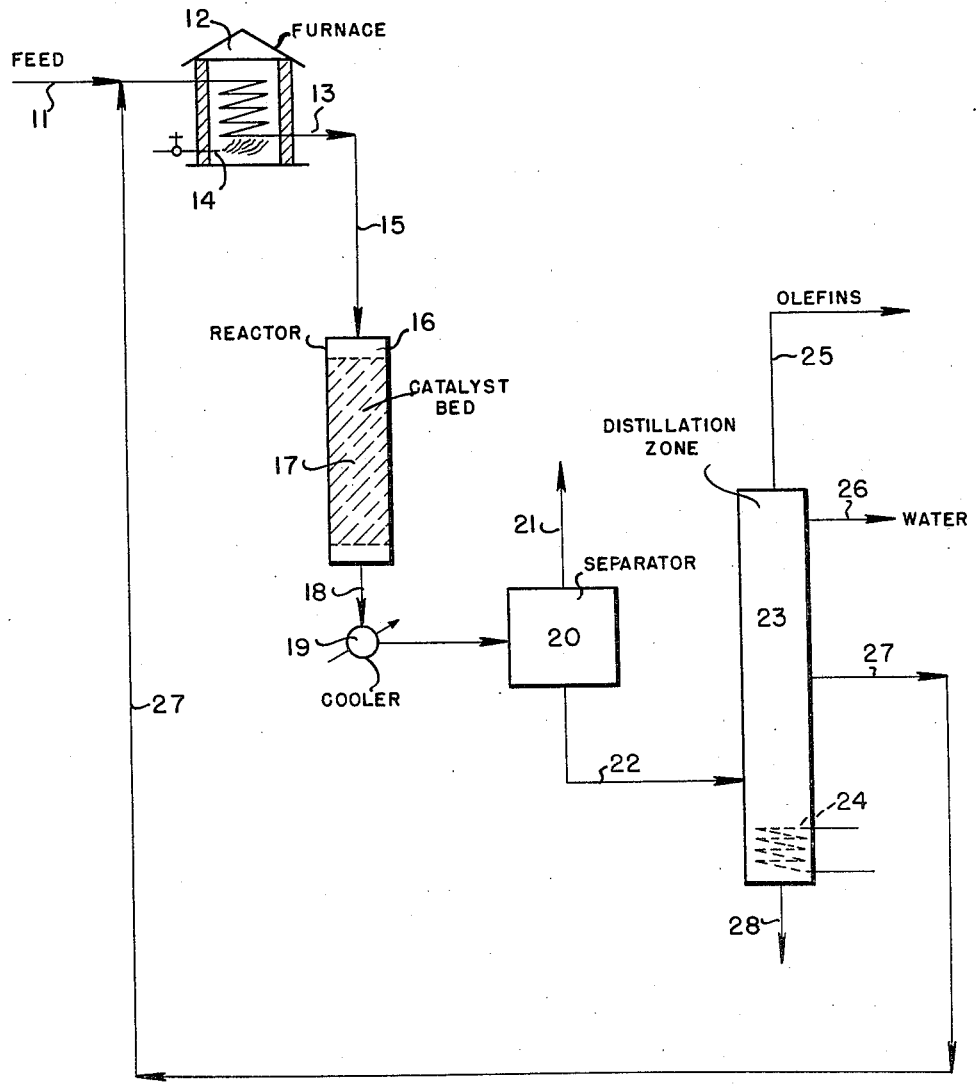
James A. Dinwiddie, INVENTOR.
BY
ATTORNEY.

Patented Feb. 20, 1951

2,542,487

UNITED STATES PATENT OFFICE 2,542,487

PRODUCTION OF OLEFINS FROM OXIDES

James A. Dinwiddie, Goose Creek, Tex., assignor, by mesne assignments, to Standard Oil Development Company, Elizabeth, N. J., a corporation of Delaware Application October 17, 1947, Serial No. 780,387

3 Claims. (Cl. 260—682)

The present invention is directed to a method for producing olefinic hydrocarbons. More particularly, the invention is directed to a method whereby oxygenated organic compounds are converted to olefinic hydrocarbons.

Olefinic hydrocarbons do not occur naturally in large quantities. However, they are produced in appreciable quantities in the cracking of petroleum. Thus, since the advent of cracking petroleum hydrocarbons on a commercial scale (circa 1912), olefinic hydrocarbons have been available in increasingly large quantities. These materials are valuable starting points in the synthesis of a number of valuable olefinic derivatives.

Natural petroleum is being consumed at increasingly high rates throughout the world. Consequently, searches for crude petroleum are being extended to a marked degree. The high consumption of crude petroleum has caused some concern with regard to the depletion of these natural resources. Therefore, the refiner of crude petroleum has turned his attention to methods of producing synthetic petroleum. These methods for producing synthetic products usually include the classic work of Fischer and Tropsch in which carbon monoxide and hydrogen are reacted in the presence of a catalyst to form a mixture of hydrocarbons and oxygenated organic compounds. The hydrocarbons are quite useful when separated from the oxygenated organic compounds and the same applies to the organic compounds when they are separated from the hydrocarbons.

If the syntheses of these materials are widely accepted, the production of the various organic compounds may cause a glut on the market. Therefore, methods for converting oxygenated organic compounds to other more valuable materials may achieve considerable importance.

I have now discovered a method for converting oxygenated organic compounds, such as the oxides of the mono-olefins, to the olefinic hydrocarbons. It has been found that the olefin oxides, which are illustrated by ethylene oxide and its homologues, may be converted in substantial yields to the corresponding olefins by passing the heated oxide in a vaporized condition over a catalyst comprising a metal or oxide of the iron type elements of group VIII of the periodic table in admixture with a suitable alkaline promoting material.

The present invention may be described briefly as involving the vaporization of an oxide of the type mentioned, heating the vaporized material to a temperature in the range from about 400° to 1000° F., and contacting the heated vaporized oxygenated compound with a catalyst, maintained at the aforementioned temperature, such as that illustrated by the iron oxides, suitably promoted with an alkaline material, such as potassium carbonate, to form a product including an appreciable quantity of the mono-olefin.

The type of catalysts employed in the present invention will usually be iron, cobalt, and nickel, either as the metals themselves or the oxides thereof, or mixtures of the oxides of the metals. For example, $Fe_2O_3$ is a suitable catalyst in the practice of the present invention.

The catalyst should be promoted with a material such as illustrated by potassium carbonate, potassium chloride, potassium fluoride, the corresponding compounds of lithium and sodium, magnesium oxide, copper oxide, and other similar promoting materials which have been found suitable in promoting the activity of the catalysts of the group VIII metals.

The promoter, as exemplified by potassium carbonate, will usually be employed in the catalyst in relatively small amounts. For example, an amount of promoter in the range from about 0.5 to about 15% will usually suffice with a preferred range of about 1 to about 8%.

The temperature of the reaction in which the oxides are converted to the mono-olefins may range from 400° to about 1000° F. with a preferred temperature in the range from about 450° to 650° F.

Pressures may range from about atmospheric pressure up to about 500 pounds of pressure with a preferred range of from about 50 pounds to 300 pounds per square inch gauge.

The feed, including the oxide, may be contacted with the catalyst for a time sufficient to give a feed throughput corresponding to about 0.1 to about 1 volume of feed per volume of catalyst per hour. Some leeway in this respect is allowed; for purposes of obtaining higher conversions, it may be desirable to employ a low throughput whereas, when the unreacted materials are recycled, high throughputs may be desirable. Thus, it may be possible to increase the throughput up to about 3 volumes of feed stock per volume of catalyst per hour.

The process of the present invention may be conducted either by contacting the oxide with the catalyst in a fixed bed operation in which the catalyst is arranged in cases or a plurality of cases, or it may be conducted by employing the so-called fluidized powder technique in which the vaporized feed stock has suspended in it the catalyst which contacts the feed as a suspension of solids in vaporized feed. This particular mode of operation may be preferred under circumstances where heat consumption is large since the dispersion of the finely divided catalyst in the vaporized feed allows a ready dispersion of the heat which may be generated by the reaction.

The invention will now be further illustrated by reference to the drawing in which the sole figure presents a flow diagram of one mode of practicing the invention.

Referring now to the drawing, numeral 11 designates a feed line through which an oxide, such as ethylene oxide, may be introduced into the system. Assuming that the feed stock is ethylene oxide, it is passed through line 11 into a furnace 12 in which is located a heating coil 13. Furnace 12 is provided with a burner 14 wherein the temerature of the feed in heating coil 13 is raised to a temperature in the range between about 400° and 1000° F. The vaporized and heated feed then discharges from furnace 12 by line 15 into a reactor 16 containing a catalyst bed 17. For purposes of illustration, it is assumed that catalyst bed 17 is comprised of iron oxide containing approximately 3% by weight of potassium carbonate. The heated ethylene oxide passes through catalyst bed 17 and is converted on contact therewith to a product including a substantial amount of the mono-olefin, ethylene.

The product issues from reaction zone 16 by way of line 18 containing a cooler 19 which reduces its temperature to substantially atmospheric temperature before it discharges into separator 20. In separator 20, a separation is made between fixed gases, including the oxides of carbon as well as hydrogen, which are removed from the separator by line 21 for further use as may be desired, and a liquid phase including hydrocarbons, unreacted feed stock, and water which is discharged by line 22. Line 22 introduces liquid product into a distillation zone 23. Distillation zone 23 is shown as a single distillation tower equipped with a heating means, such as a heating coil 24, for adjustment of temperatures and pressures. It will be understood, of course, that distillation zone 23 may include a plurality of distillation towers, but, for purposes of simplifying the description, distillation zone 23 is shown as a single distillation tower. It will be further understood that distillation zone 23 will be provided with suitable internal equipment, such as bell caps, plates, and the like, to insure intimate contact between liquids and vapors.

Conditions of temperature and pressure are adjusted in distillation zone 23 to obtain overhead by line 25 an olefinic fraction including ethylene, a water fraction by line 26 which may contain dissolved oxygenated organic compounds, and an unreacted ethylene oxide fraction by line 27 which may be routed thereby to the feed line 11 for recycling in the process. Heavier materials, including hydrocarbons boiling above the boiling point of ethylene oxide and oxygenated organic compounds, may be discharged from the system by line 28 for further use in the process as may be desired.

It will be seen from the foregoing description taken with the drawing that the present invention provides a simple effective process for producing olefins from the olefinic oxides.

While not described in the description taken with the drawing, it may be desirable under some conditions to dilute the feed with a diluent, such as a light hydrocarbon as illustrated by methane, or with a substantially inert gas such as nitrogen, water vapor, and the like. It may also be desirable to include in the feed stock an oxide of carbon which may be removed with the gases vented by line 21.

The invention will be further illustrated by a specific example in which propylene oxide was contacted with a catalyst comprising $Fe_3O_4$ and containing 3% by weight of potassium carbonate. The propylene oxide was heated and vaporized and passed at a temperature of 575° F. and at a pressure of 150 pounds per square inch gauge over the catalyst at a feed rate of 0.3 volume of feed per volume of catalyst per hour. The product from the system was analyzed and found to contain 35.6% by volume of propylene and other gases including hydrogen, carbon monoxide and carbon dioxide. Some water was also formed.

While the invention has been described and illustrated by examples in which the catalyst was contacted with propylene oxide, it is to be understood that other oxides may be employed. For example, the higher olefinic oxides may be used as feed stock in the process. As exemplary of the higher members of the series of compounds which may be found useful in the present invention may be mentioned ethylene oxide, butylene oxides, pentylene oxides, and other higher molecular weight mono-oxides may be used in lieu of the ones illustrated in the examples.

The nature and objects of the present invention having been fully described and illustrated, what I wish to claim as new and useful and to secure by Letters Patent is:

1. A method for producing a mono-olefin which comprises the steps of contacting a mono-olefin oxide with a catalyst selected from the group VIII metals and oxides thereof and including a promoter for the reaction at an elevated temperature in the range of 400° to 1000° F. to produce a product including a mono-olefin having the same number of carbon atoms as said mono-olefin oxide and recovering said mono-olefin.

2. A method for producing a mono-olefin which comprises vaporizing a mono-olefin oxide having at least two carbon atoms, heating said mono-olefin oxide to a temperature in the range between 400° and 1000° F., contacting said heated, vaporized mono-olefin oxide with a catalyst selected from the metals and oxides thereof of the group VIII metals and including an alkaline promoter for the reaction at a temperature in the range between 400° and 1000° F. and a pressure in the range from atmospheric to 500 pounds per square inch gauge for a time sufficient to form a product including a mono-olefin having at least two carbon atoms and having the same number of carbon atoms as said mono-olefin oxide and recovering said mono-olefin from said product.

3. A method for producing propylene which comprises vaporizing propylene oxide, heating the vaporized propylene oxide to a temperature of approximately 575° F., contacting the heated vaporized propylene oxide with iron oxide containing approximately 3% potassium carbonate at a temperature of 575° F. and at a pressure of 150 pounds per square inch gauge under conditions to form a product including propylene and recovering propylene from said product.

JAMES A. DINWIDDIE.

REFERENCES CITED

The following references are of record in the file of this patent:

UNITED STATES PATENTS

| Number | Name | Date |
|---|---|---|
| 1,010,050 | Hofmann et al. | Nov. 28, 1911 |
| 1,033,179 | Kyriakides et al. | July 23, 1912 |
| 2,156,217 | Andrews et al. | Apr. 25, 1939 |
| 2,376,987 | Becker et al. | May 29, 1945 |
| 2,437,773 | Whaley | Mar. 16, 1948 |